US009603428B1

(12) United States Patent
Al-Hasan

(10) Patent No.: US 9,603,428 B1
(45) Date of Patent: Mar. 28, 2017

(54) PORTABLE WORKSTATION

(71) Applicant: Khaled Jafar Al-Hasan, Safat (KW)

(72) Inventor: Khaled Jafar Al-Hasan, Safat (KW)

( * ) Notice: Subject to any disclaimer, the term of this patent is extended or adjusted under 35 U.S.C. 154(b) by 0 days.

(21) Appl. No.: 15/210,185

(22) Filed: Jul. 14, 2016

Related U.S. Application Data

(62) Division of application No. 14/965,797, filed on Dec. 10, 2015, now Pat. No. 9,414,660.

(51) Int. Cl.
| | | |
|---|---|---|
| *A45C 15/00* | (2006.01) | |
| *A45C 13/02* | (2006.01) | |
| *A45C 13/26* | (2006.01) | |
| *A45C 11/00* | (2006.01) | |
| *G06F 1/16* | (2006.01) | |
| *H02J 7/35* | (2006.01) | |
| *G02B 13/16* | (2006.01) | |
| *G02B 21/14* | (2006.01) | |
| *G03B 21/14* | (2006.01) | |

(52) U.S. Cl.
CPC .............. *A45C 15/00* (2013.01); *A45C 11/00* (2013.01); *A45C 13/02* (2013.01); *A45C 13/262* (2013.01); *G02B 13/16* (2013.01); *G03B 21/145* (2013.01); *G06F 1/1635* (2013.01); *G06F 1/1637* (2013.01); *G06F 1/1656* (2013.01); *H02J 7/35* (2013.01); *A45C 2011/003* (2013.01); *A45C 2013/025* (2013.01); *A45C 2013/267* (2013.01)

(58) Field of Classification Search
USPC ....................................................... 206/576
See application file for complete search history.

(56) References Cited

U.S. PATENT DOCUMENTS

| | | | |
|---|---|---|---|
| 5,242,056 A | 9/1993 | Zia et al. | |
| 5,485,922 A | 1/1996 | Butcher | |
| 5,676,223 A | 10/1997 | Cunningham | |
| 6,105,763 A | 8/2000 | Saetia | |
| 6,454,064 B1 | 9/2002 | Cheng | |
| 7,278,644 B2 | 10/2007 | Villarreal | |
| 8,804,327 B2 | 8/2014 | Al-Khayyat | |
| 9,414,660 B1 * | 8/2016 | Al-Hasan | A45C 15/00 |
| 2002/0063072 A1 * | 5/2002 | Pham | A45C 5/14 206/320 |
| 2007/0290115 A1 * | 12/2007 | Meyer | E05B 73/0082 248/346.06 |

(Continued)

FOREIGN PATENT DOCUMENTS

CA      2 406 877 A1    6/2006

*Primary Examiner* — Kimberly N Kakalec
(74) *Attorney, Agent, or Firm* — Richard C. Litman

(57) ABSTRACT

The portable workstation includes a case having a base, a first side wall and a second side wall, a back side wall positioned between the first side wall and the second side wall, and a selectively pivotable cover including an upper side and a lower side. The lower side of the pivotable cover can have a screen for displaying media, such as visual images. An upper compartment is positioned beneath the selectively pivotable cover and a plurality of drawers is positioned beneath the upper compartment. A locking mechanism is positioned in communicating relation with each of the plurality of drawers. A telescopic handle is coupled to the back side wall. A ruler section is positioned opposite the back side wall. At least one wheel is positioned in communicating relation with the base.

7 Claims, 10 Drawing Sheets

(56) References Cited

U.S. PATENT DOCUMENTS

| | | | |
|---|---|---|---|
| 2009/0139814 A1* | 6/2009 | Grossman | A45C 7/0086 |
| | | | 190/18 A |
| 2011/0058255 A1* | 3/2011 | Weiss | H04M 1/0264 |
| | | | 359/511 |
| 2012/0273499 A1 | 11/2012 | Evans | |
| 2013/0082051 A1* | 4/2013 | Kaufmann | A47G 21/14 |
| | | | 220/23.83 |
| 2013/0294021 A1 | 11/2013 | Zhao | |
| 2014/0092545 A1* | 4/2014 | Al-Khayyat | G06F 1/1696 |
| | | | 361/679.26 |
| 2015/0173472 A1 | 6/2015 | Gierke et al. | |

* cited by examiner

PORTABLE WORKSTATION

CROSS-REFERENCE TO RELATED APPLICATION

This application is a division of U.S. patent application Ser. No. 14/965,797, filed Dec. 10, 2015, now U.S. Pat. No. 9,414,660, issued Aug. 16, 2016.

BACKGROUND OF THE INVENTION

1. Field of the Invention

The present invention generally relates to portable office equipment, and particularly to a wheeled, multi-drawer case having a telescopic handle for storing and transporting office equipment.

2. Description of the Related Art

Business travelers typically carry with them a variety of office supplies, such as pens, paper, file folders, electronic devices, batteries, and charging equipment for the electronic equipment. For an individual travelling for business, it is often difficult to efficiently use and store the various supplies and devices needed to carry out work-related duties.

Thus, a portable work station solving the aforementioned problems is desired.

SUMMARY OF THE INVENTION

The portable workstation includes a case having a base, opposing first and second side walls, a back side wall positioned between the first side wall and the second side wall, and a selectively pivotable cover including an upper side and a lower side, the lower side having a screen configured to display visual images. The portable workstation also includes an upper compartment positioned beneath the selectively pivotable cover, the upper compartment configured to store office equipment, as well as computer peripherals and accessories, a plurality of drawers positioned between the first side wall and the second side wall, a locking mechanism positioned in communicating relation with each of the plurality of drawers, a telescopic handle coupled to the back side wall, a ruler section positioned opposite the back side wall, at least one wheel positioned in communicating relation with the base, a battery compartment, and a case handle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
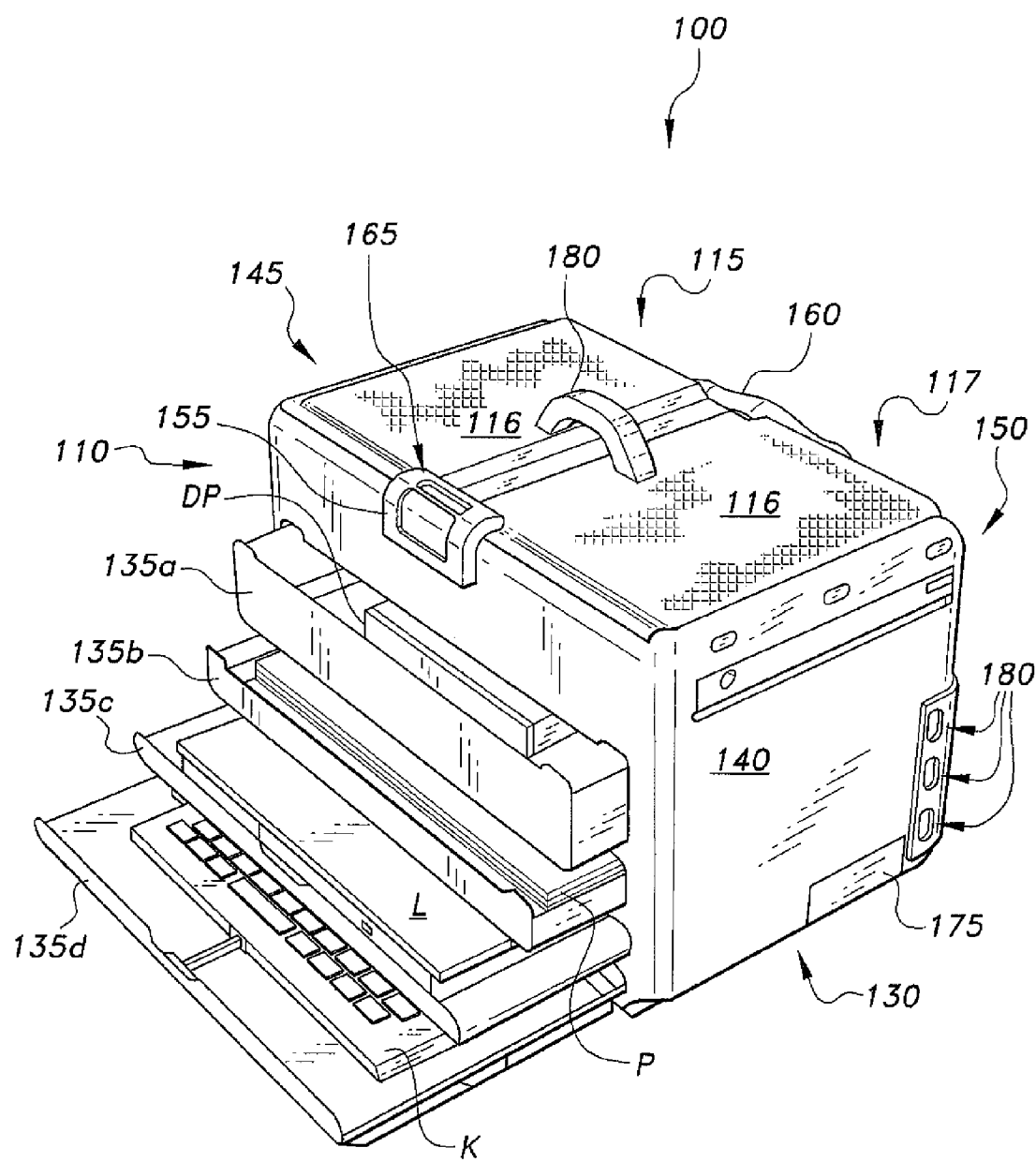
FIG. 1 is an environmental, perspective view of a portable workstation, according to the present invention.
Figure 2A:
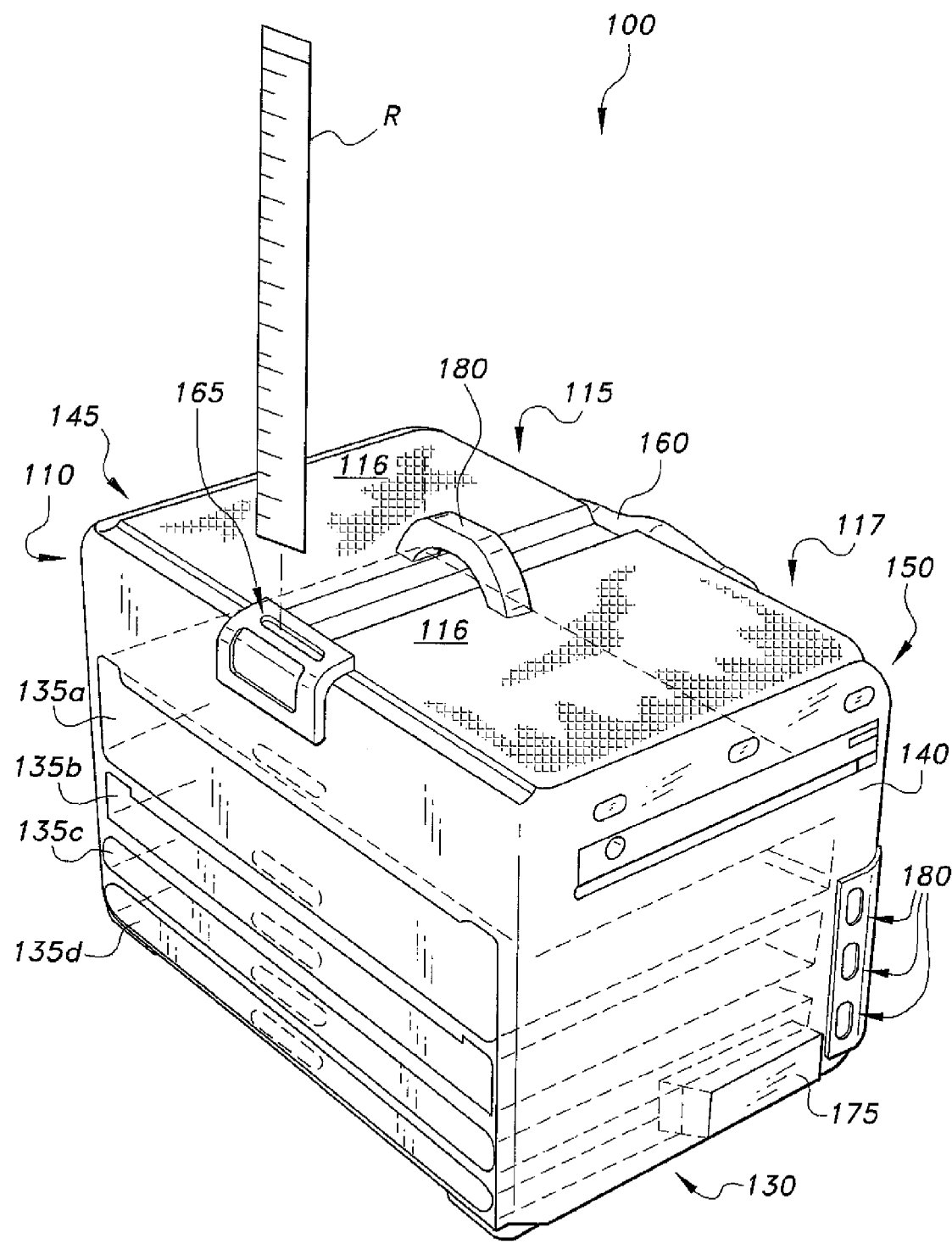
FIG. 2A is an illustration of a ruler being inserted into a ruler section of the portable workstation, according to the present invention.
Figure 2B:
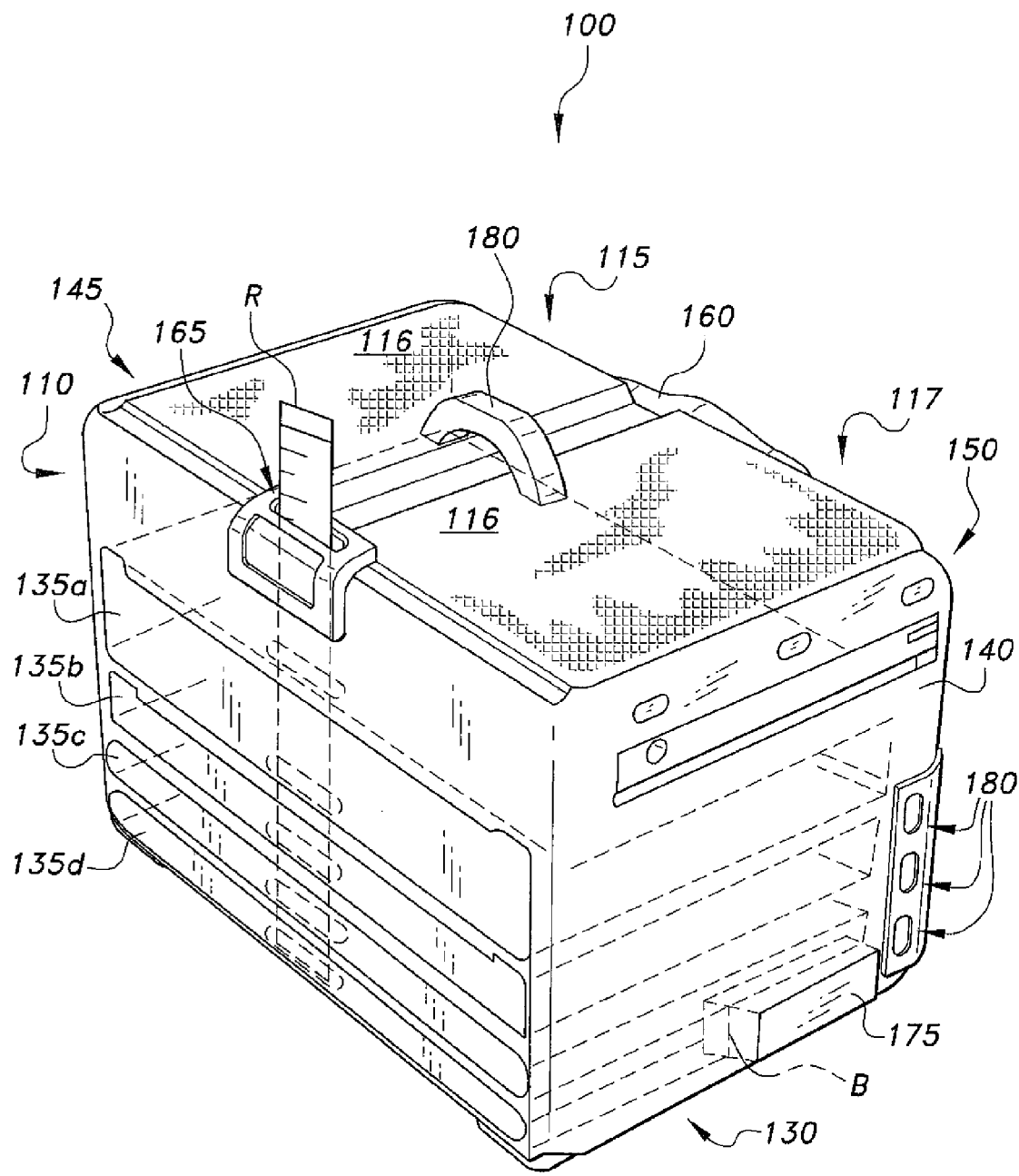
FIG. 2B is an illustration of a ruler inserted into the ruler section of the portable workstation, according to the present invention.
Figure 3:
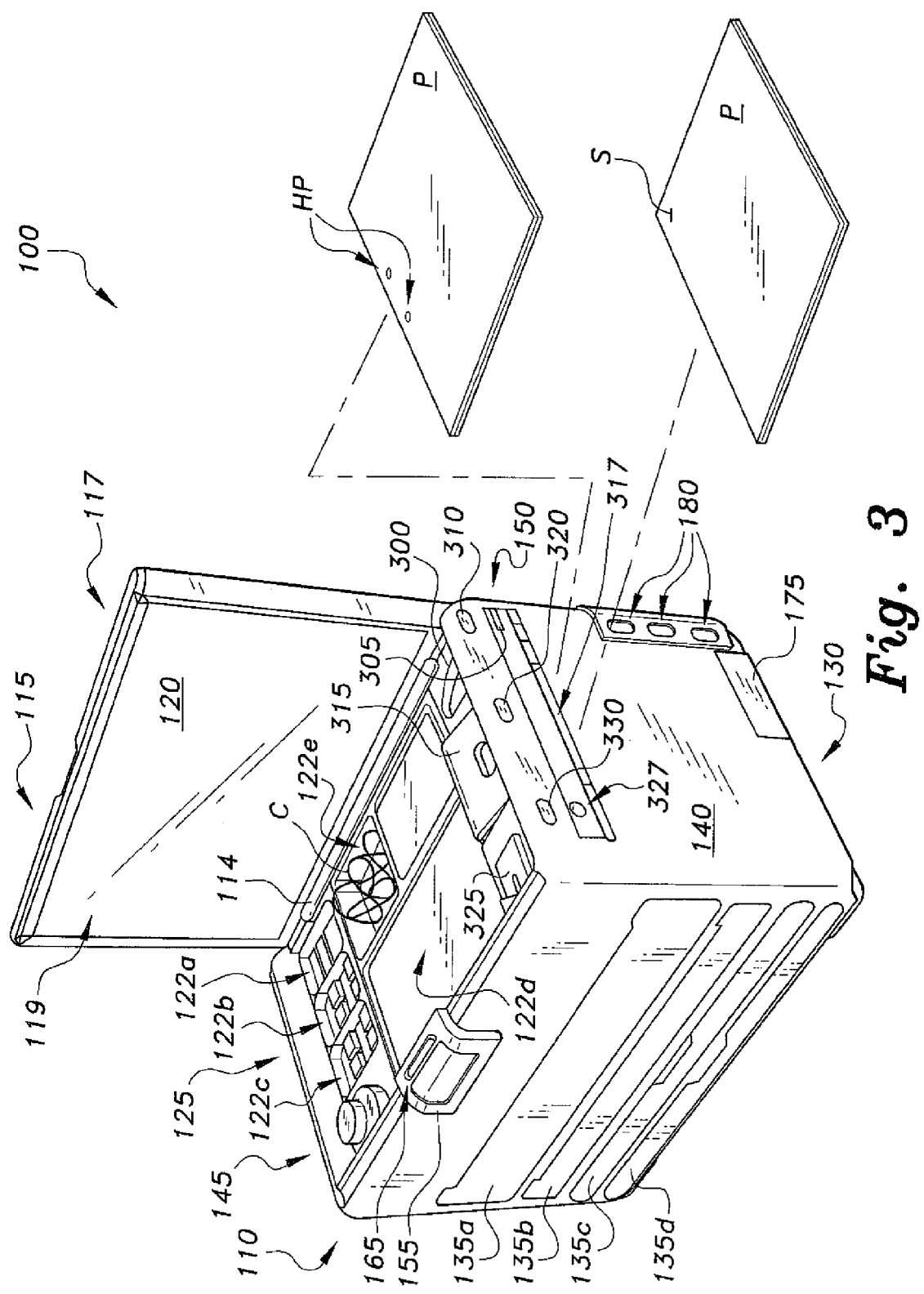
FIG. 3 is an illustration of a selectively pivotable cover of the portable workstation including a screen, according to the present invention.

Referring to FIGS. 1 through 9, a portable workstation 100 is generally illustrated. The portable workstation 100 includes a case 110 having a base 130, a first side wall 140 and a second side wall 145, a back side wall 150 positioned between the side walls 140, 145, and a selectively pivotable cover 115 including an upper surface 117 and a lower surface 119 (FIG. 3). The first side wall 140 and the second side wall 145 are positioned parallel to one another on the base 130. The selectively pivotable cover 115 is positioned in communicating relation with the back side wall 150, such as by a hinge mechanism 114, that can allow the selectively pivotable cover 115 to pivot about the hinge mechanism 114. The side walls 140, 145 and the back side wall 150 extend vertically between the base 130 and the selectively pivotable cover 115.

Figure 8:
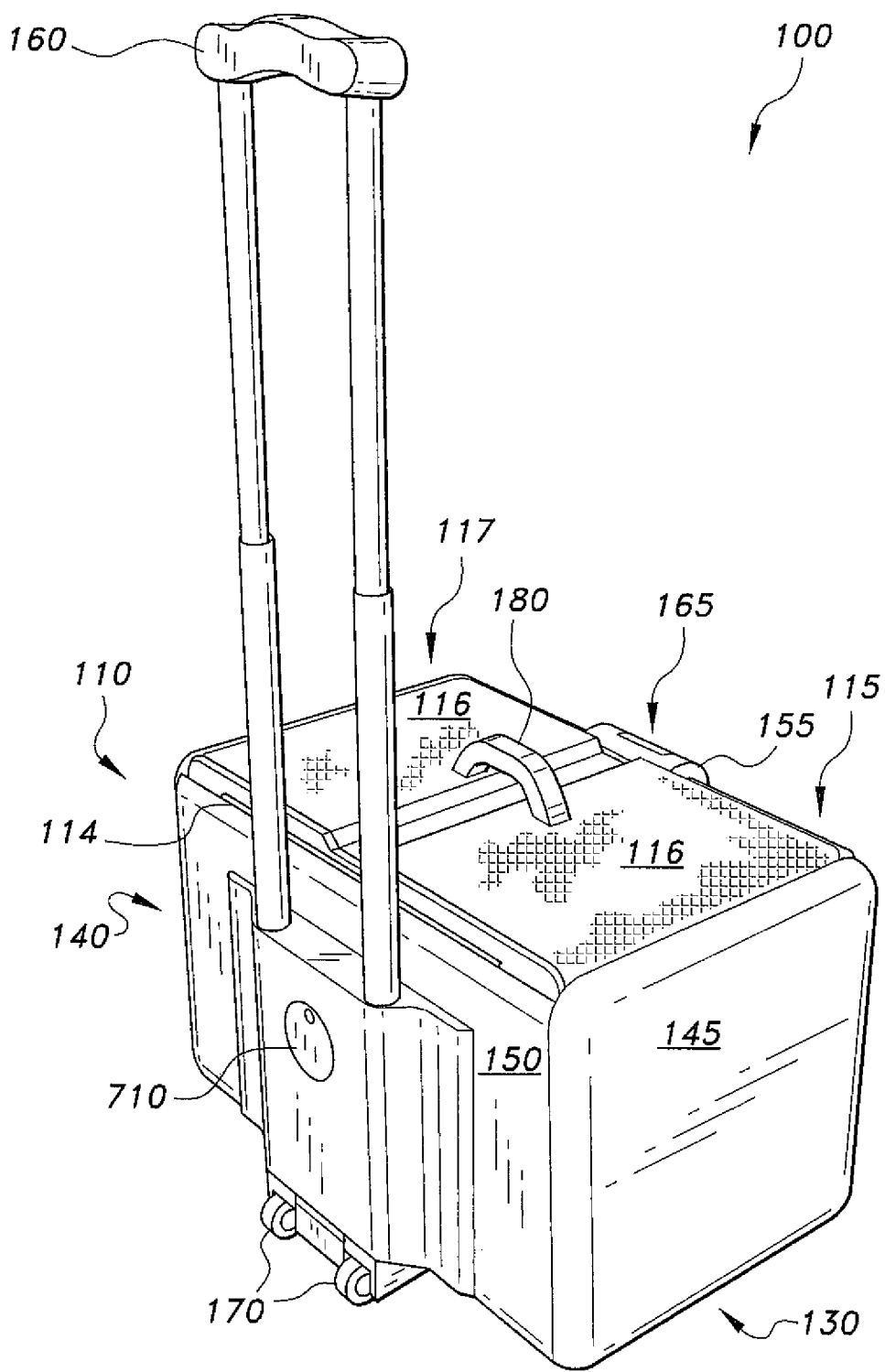
FIG. 8 is a rear side view of a portable workstation having an extended telescopic handle, according to the present invention.

The portable workstation 100 includes a plurality of drawers, such as a first drawer 135a, a second drawer 135b, a third drawer 135c, and a fourth drawer 135d. The plurality of drawers 135a-135d are positioned between the side walls 140, 145. The plurality of drawers 135a-135d can be slidably connected to the side walls 140, 145. An upper compartment 125 (FIG. 3) is positioned between the selectively pivotable cover 115 and the first drawer 135a. A locking mechanism 155 is positioned in communicating relation with each of the plurality of drawers 135a-135d. The locking mechanism 155 can be manipulated to secure or lock each of the plurality of drawers 135a-135d of the case 110 once the drawers 135a-135d are closed. A telescopic handle 160 is coupled to the back side wall 150 of the case 110. The telescopic handle 160 is attached to the back side wall 150 to facilitate transport of the portable workstation 100 (FIG. 8). A ruler receptacle 165 is positioned opposite the back side wall 150 of the case 110. The ruler receptacle 165 is configured for receiving a ruler R (FIGS. 2A and 2B). The ruler section or receptacle 165 can be defined by a series of slots in the cover 115 and the drawers 135a-135d. At least one wheel 170 (FIG. 8) is positioned in communicating relation with the base 130 of the case 110. A battery compartment 175 is positioned on the first side wall 145. The battery compartment 175 is configured for storing at least one battery. A case handle 180 is coupled to the upper side 117 of the selectively pivotable cover 115.

The case 110 can be formed from any suitable type of material, such as flexible, lightweight materials. For example, the case 110 can be formed from forced plastic and leather having a variety of colors for decoration. The case 110 can also have any suitable size, such as 40 cm×25 cm×25 cm, so that the portable workstation 100 can be used as a personal item inside an airplane. Further, the base 130 of the case 110 can be formed from any suitable type of durable material and can have any suitable shape, such as a generally rectangular shape.

The upper compartment 125 of the case 110 can include a plurality of sub-compartments, such as a first sub-compartment 122a, a second sub-compartment 122b, a third cub-compartment 122c, a fourth sub-compartment 122d, and a fifth sub-compartment 122e, configured for storing office equipment and computer peripherals and accessories. For example, the first sub-compartment 122a can be used to store staples, the second sub-compartment 122b can be used to store paperclips, the third sub-compartment 122c can be used to store erasers, the fourth sub-compartment 112d can be used to store a mouse pad MP or an extra mouse M, and the fifth sub-compartment 122e can be used to store a USB cable C, as well as other types of cables for the laptop L and other smart devices, such as a smartphone, an Ipad®, a Kindle®, or a Surface®, such as power cables and HDMI cables.

The case 110 can include at least one outlet socket 180, such as a USB outlet, for connecting power cables, such as to power or charge the laptop L or any other type of smart devices, the at least one outlet socket 180 being positioned on the first side wall 140. The locking mechanism 155 can be any suitable type of locking mechanism, such as a combination lock, configured for securing each of the plurality of drawers 135a-135d of the case 110. The ruler R, once inserted in the ruler receptacle 165 may also be used to prevent, such as substantially prevent, each of the plurality of drawers 135a-135d from opening, as illustrated in FIG. 2B.

Each of the plurality of drawers 135a-135d can be any suitable type of drawer capable of carrying a variety of different types of office equipment, as well as electronic devices. For example, the first drawer 135a may be configured to carry any type of data illustration device, such as a digital projector DP, the second drawer 135b may be used to carry paper P, pads of paper, files, folders, or other office equipment, the third drawer 135c may be used for storing the laptop L or other electronic device, and the fourth drawer 135d may be configured to provide a support surface for an electronic device.

Optionally, the portable workstation can be configured to include a computer device or computer system including a user interface, computer readable memory, a controller/processor, and computer display, for example. The display, the processor, the memory, and any associated computer readable media can be in communication with one another by any suitable type of data bus, as is well known in the art. For example, the lower surface 119 can include a screen 120, such as an LCD screen or a touch screen, for displaying media, such as visual images. The fourth drawer 135d can include a keyboard K and a plurality of clamps 185 configured for securing the keyboard K, as illustrated in FIGS. 4, 5, 6 and 9. The fourth drawer 135d can include an outlet (not shown) for connecting the keyboard K to the screen 120 to display visual images, as well as for powering the laptop L when the laptop L is being used.

Figure 9:
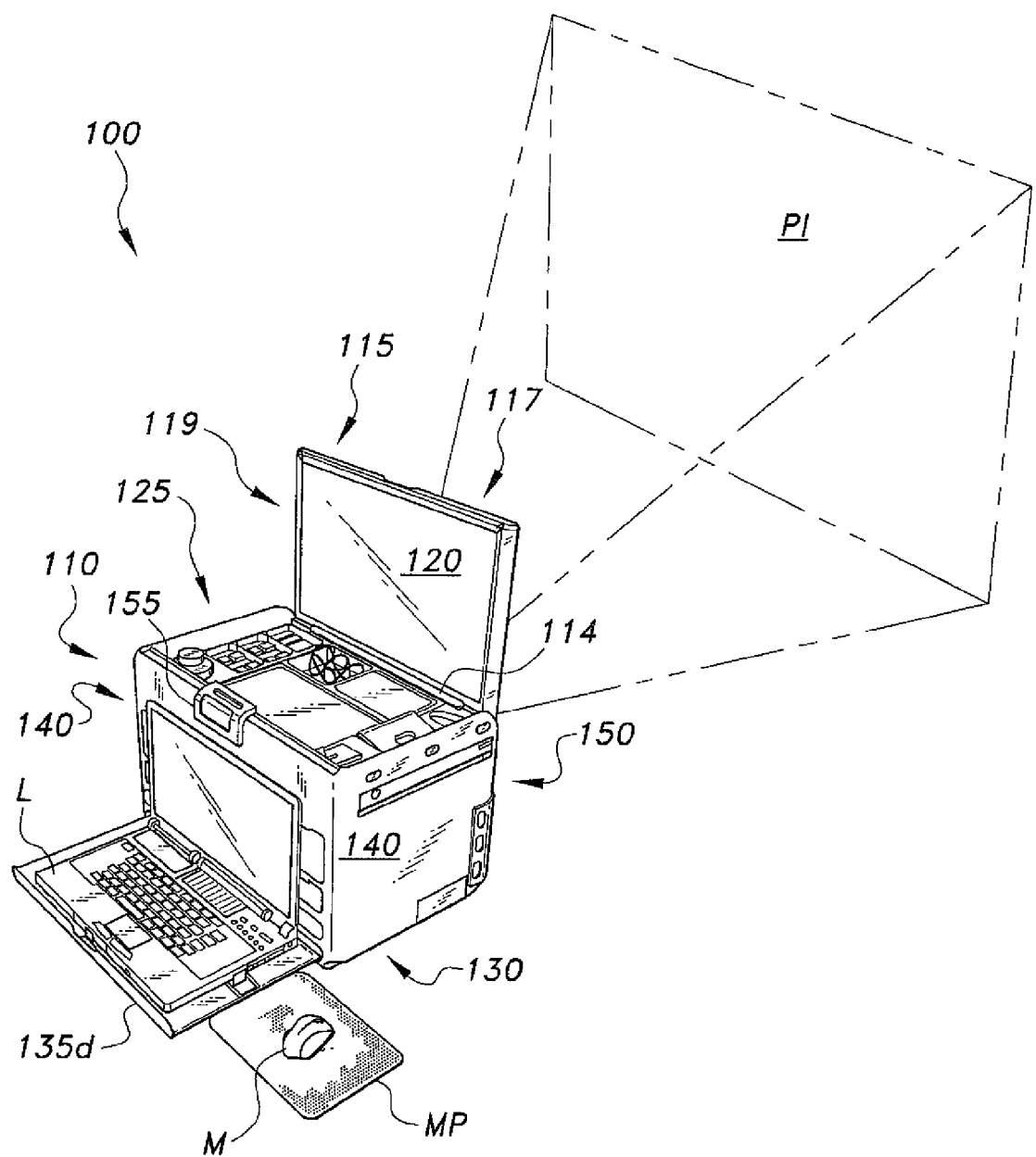
FIG. 9 is an illustration of a portable workstation displaying a projected image, according to the present invention.

Further, the portable workstation 100 includes a lens 700 (FIG. 7) positioned on the back side wall 150 of the case 110. The lens 700 is configured for displaying a projected image PI from the digital projector DP, as illustrated in FIG. 9, for enlarging an image displayed on the laptop L, or for enlarging an image displayed on the screen 120. The portable workstation 100 includes a lens cover 710 pivotably coupled to the back side wall 150, such as by a hinge mechanism (not shown), so that the lens cover 710 can move about the hinge mechanism, such as from an open position to a close position or vice versa. The lens cover 710 is configured for protecting, such as substantially protecting, the lens 700, from damage.

The portable workstation 100 can be powered by any suitable power source, such as a rechargeable battery B. The rechargeable battery B is capable of powering the laptop L, as well as any other electronic devices that are being stored in the portable workstation 100. The upper side 117 of the selectively pivotable cover 115 includes at least one solar panel 137. The at least one solar panel 116 is positioned in communicating relation with the rechargeable battery B. The at least one solar panel 116 is configured for charging the rechargeable battery B positioned within the battery compartment 175 of the case 110 so that the rechargeable battery B can power the portable workstation 100, as well as any other electronic devices that are being stored in the portable workstation 100, such as via the at least one outlet socket 180.

The portable workstation 100 can include a stapler 300 positioned within the upper compartment 125 of the case 110. A stapler opening 305 configured for receiving paper P that is to be stapled together, and a stapler power button 310 having an "on" position and an "off" position can be disposed on an exterior of the workstation 100. The stapler power button 310 is configured for activating the stapler 300. By way of operation, a user can activate the stapler 300 by switching the stapler power button 310 to the "on" position and, subsequently, inserting a plurality of individual sheets of paper P into the stapler opening 305 so that the stapler 300 can insert a staple S into the individual sheets of paper P, as illustrated in FIG. 3.

The portable workstation 100 can include a hole puncher 315 positioned within the upper compartment 125 of the case 110, a hole punch opening 317 configured for receiving paper P, and a hole punch power button 320 having an "on" position and an "off" position. The hole punch power button 320 is configured for activating the hole puncher 315. By way of operation, the user can activate the hole puncher 315 by switching the hole puncher power button 320 to the "on" position and, subsequently, inserting at least one sheet of paper P into the hole punch opening 317 so that the hole puncher 315 can punch a hole H into the at least one sheet of paper P, as illustrated in FIG. 3.

The portable workstation 100 can also include a sharpener 325, such as a pencil sharpener, positioned within the upper compartment 125, a sharpener opening 327, and a sharpener power button 330 having an "on" position and an "off" position. The sharpener power button 330 is configured for activating the sharpener 325. By way of operation, the user can activate the sharpener 325 by switching the sharpener power button 330 to the "on" position and, subsequently, inserting a writing utensil, such as a pencil (not shown), into the sharpener opening 327.

Once the selectively pivotable cover 115 and each of the plurality of drawers 135a-135d have been closed, the user can insert the rule R into the rule section 165 and lock the locking mechanism 155 to prevent, any of the plurality of drawers 135a-135d from opening unintentionally and also to prevent, the selectively pivotable cover 115 from being opened or opening unintentionally. After the locking mechanism 155 has been set, the user can extend the telescopic handle 160 outward, to facilitate transport of the portable workstation 100. The locking mechanism 155 can include a combination lock.

Figure 4:
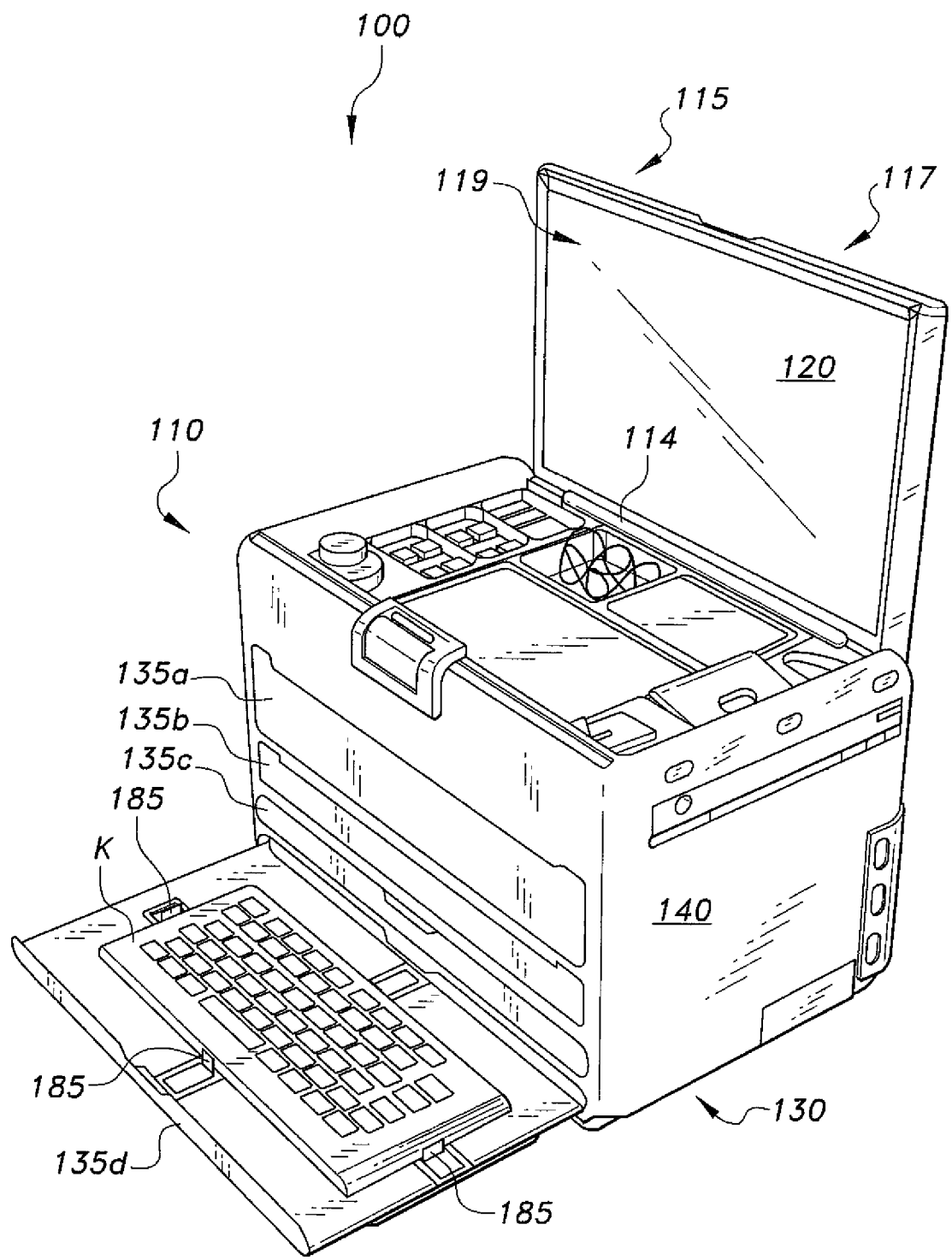
FIG. 4 is an illustration of a portable workstation having a keyboard, according to the present invention.
Figure 5:
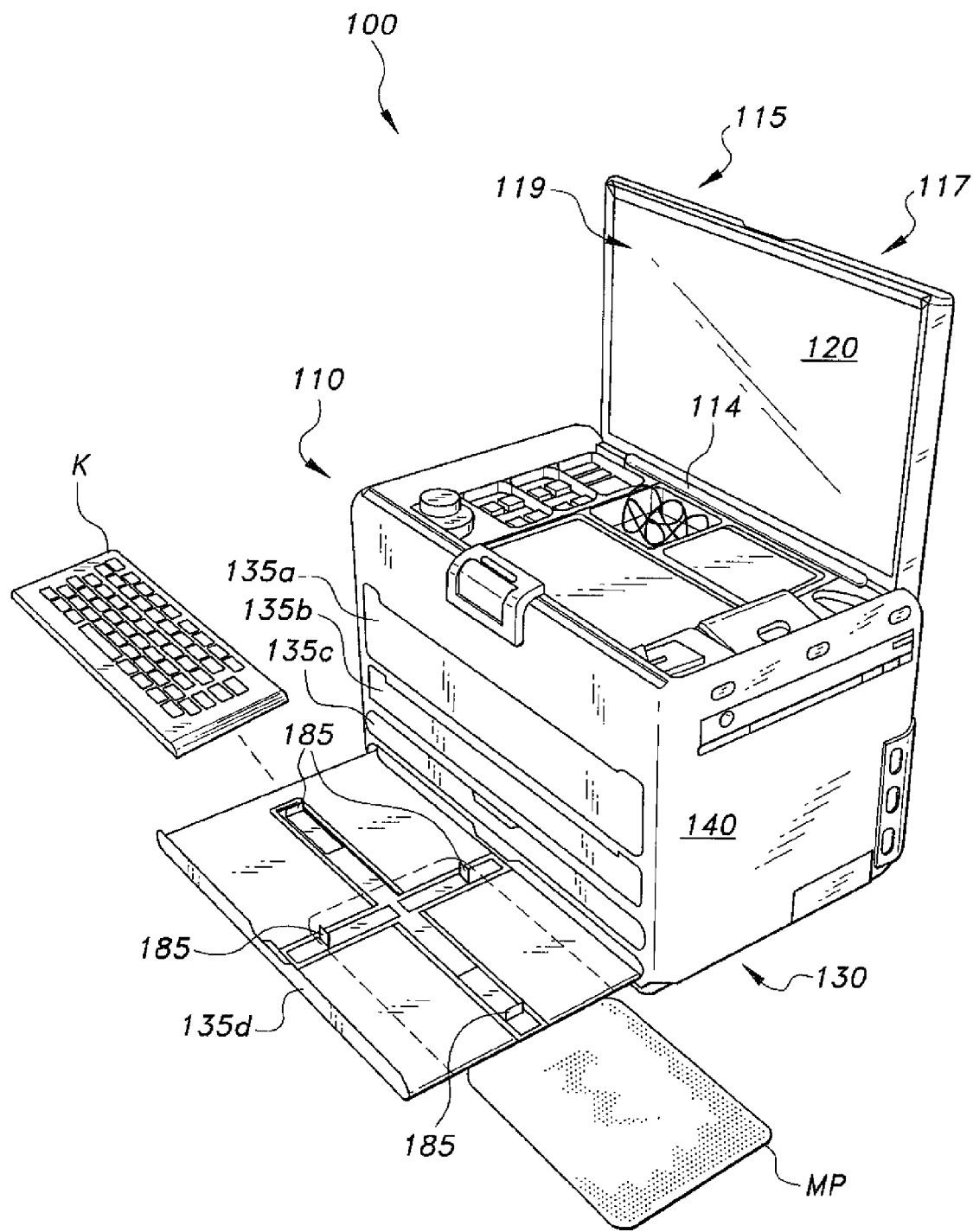
FIG. 5 is an illustration of a portable workstation having a section for holding a laptop and a mouse pad, according to the present invention.
Figure 6:
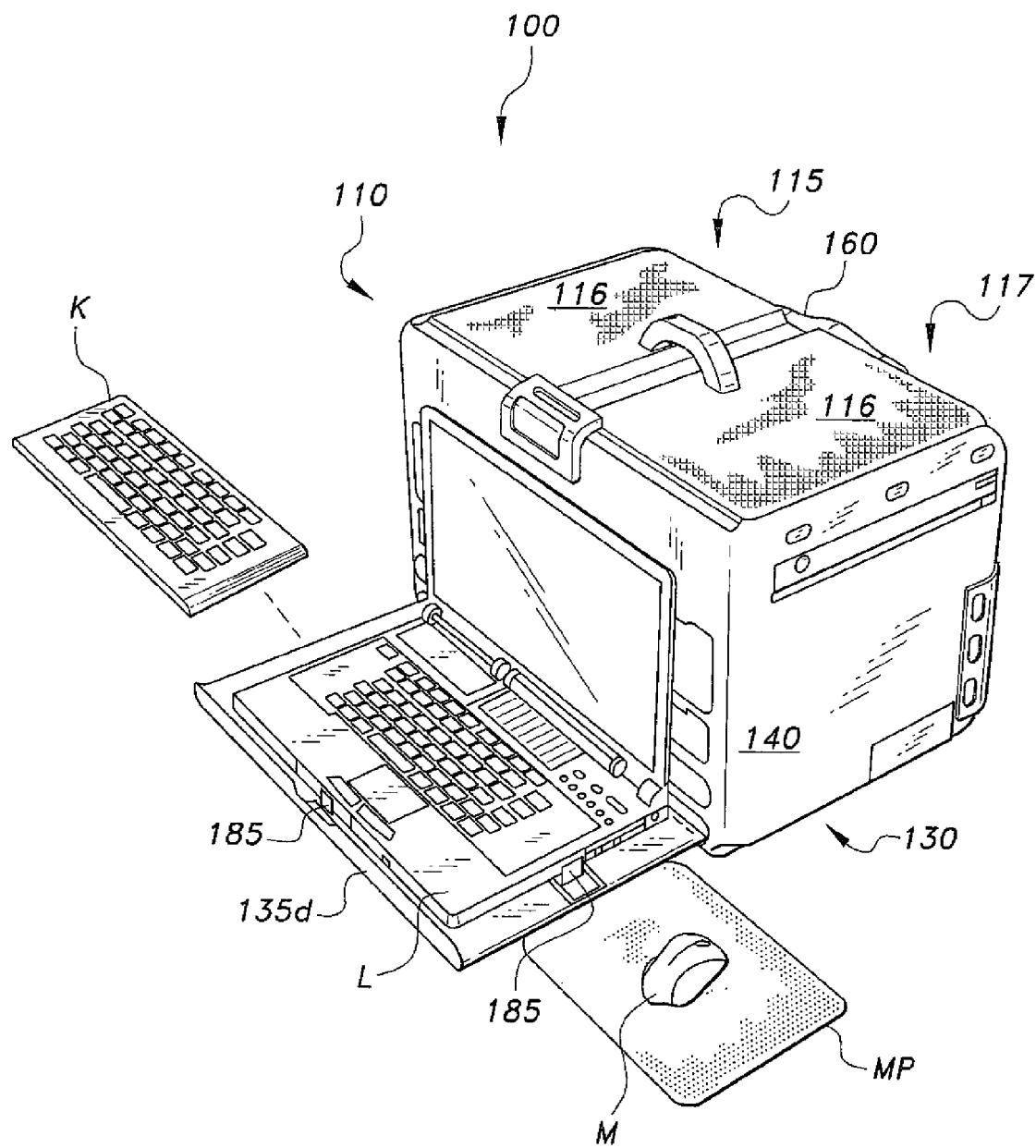
FIG. 6 is an illustration of a portable workstation having the laptop and a mouse pad, according to the present invention.
Figure 7:
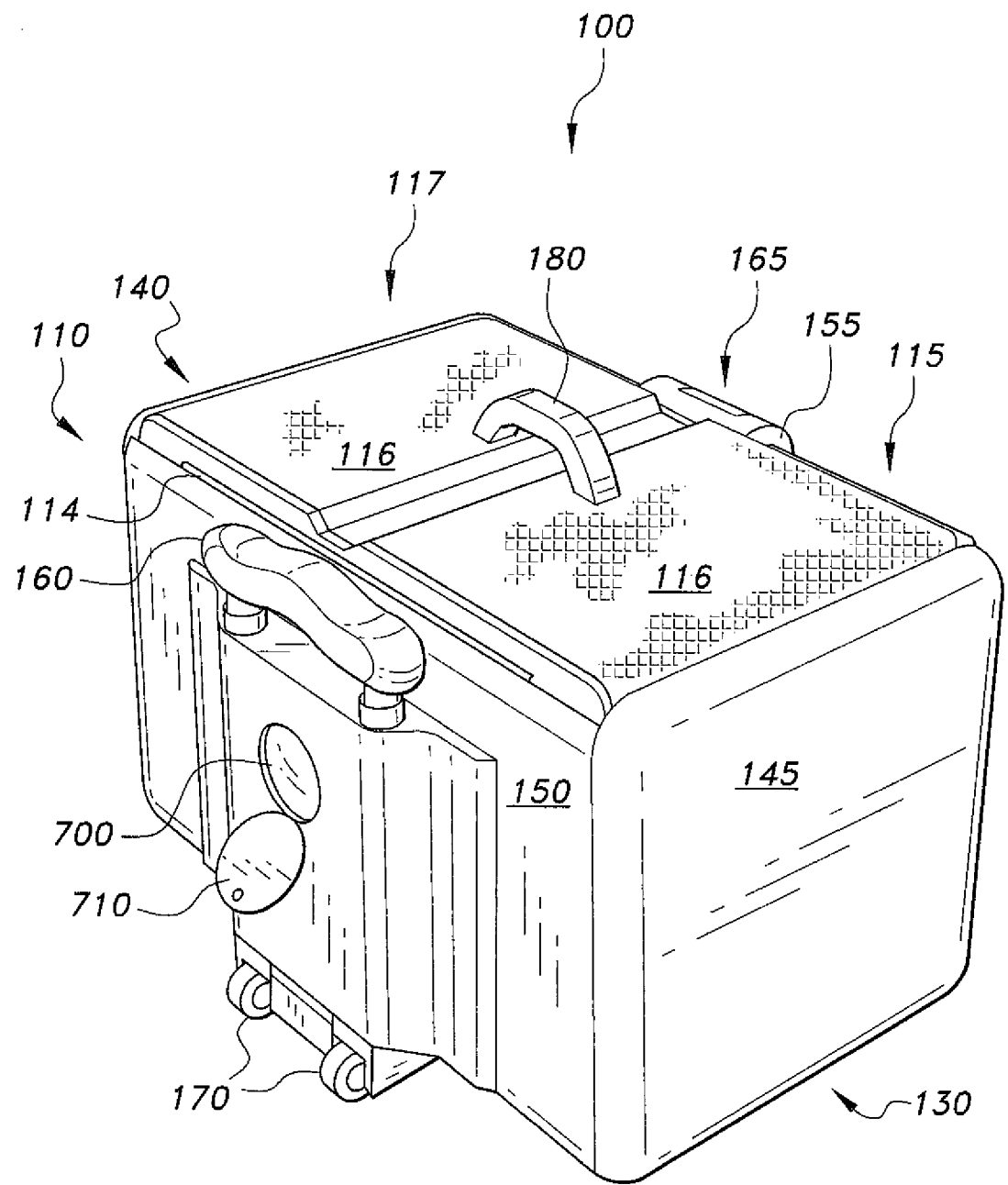
FIG. 7 is a rear side view of a portable workstation having a projector lens, a projector lens cap, at least one wheel, and a compressed telescopic handle, according to the present invention.

A user can secure the keyboard K to the fourth drawer 135d, such as by using each of the plurality of clamps 185, and connect the keyboard K to the screen 120 so as to display an image on the screen 120, as illustrated in FIG. 4. The user can also remove the keyboard K and the mouse pad MP from the fourth drawer 135*d*, as illustrated in FIG. 5, to use the fourth drawer 135*d* as a platform to secure the laptop L and use the mouse M, as illustrated in FIG. 6, with the laptop L. If desired, the user can also open the lens cover 710 to use the lens 700 to display the projected image PI on a wall, screen, or other suitable surface, as illustrated in FIG. 9, to give a presentation.

It is to be understood that the present invention is not limited to the embodiments described above, but encompasses any and all embodiments within the scope of the following claims.

I claim:

1. A portable workstation, comprising:
a case having a base, a first side wall, a second side wall opposite the first side wall, a back side wall positioned between the first side wall and the second side wall, and a selectively pivotable cover pivotably attached to the back side wall, the selectively pivotable cover including an upper surface and a lower surface;
an upper compartment positioned beneath the selectively pivotable cover;
a plurality of drawers between the first side wall and the second side wall and beneath the upper compartment, each of the plurality of drawers being slidably connected to the case;
wherein at least one of the plurality of drawers comprises a plurality of clamps configured for securing an electronic device thereto;
a locking mechanism positioned in communicating relation with each of the plurality of drawers, the locking mechanism configured for securing each of the plurality of drawers of the case;
a telescopic handle coupled to the back side wall;
a ruler section positioned opposite the back side wall and extending through the plurality of drawers, the ruler section configured for receiving a ruler; and
at least one wheel positioned in communicating relation with the base of the case.

2. The portable workstation according to claim 1, further comprising a lens positioned on the back side wall of the case, the lens configured for displaying a projected image.

3. The portable workstation according to claim 1, further comprising a rechargeable battery.

4. The portable workstation according to claim 3, wherein the upper side of the selectively pivotable cover comprises at least one solar panel configured for charging the rechargeable battery.

5. A portable workstation, comprising:
a case having a base, a first side wall and a second side wall opposite the first side wall, a back side wall positioned between the first side wall and the second side wall, a selectively pivotable cover pivotably attached to the back side wall, the selectively pivotable cover including an upper surface and a lower surface;
an upper compartment positioned beneath the selectively pivotable cover;
a plurality of drawers being positioned between the first side wall and the second side wall and beneath the upper compartment, each of the plurality of drawers being slidably connected to the case;
a plurality of clamps disposed in at least one of plurality of drawers, the plurality of clamps being designed and configured for securing office equipment therein;
a locking mechanism positioned in communicating relation with each of the plurality of drawers, the locking mechanism configured for securing each of the plurality of drawers of the case;
a telescopic handle coupled to the back side wall;
a ruler section vertically designed and configured for receiving a ruler therein;
a lens positioned on the back side wall of the case, the lens configured for displaying a projected image;
at least one wheel positioned in communicating relation with the base of the case, a power source; and
at least one solar panel positioned on the upper side of the selectively pivotable cover, the solar panel configured for powering the power source.

6. The portable workstation according to claim 5, wherein the ruler section being positioned opposite the back side wall and extending through the plurality of drawers.

7. The portable workstation according to claim 5, wherein the power source comprises a rechargeable battery configured to power the portable workstation.

\* \* \* \* \*